United States Patent
Sato

(10) Patent No.: US 12,541,201 B2
(45) Date of Patent: Feb. 3, 2026

(54) SYSTEM FOR CORRECTING EFFECT OF TIDAL CURRENT AND WIND ON BOAT

(71) Applicant: Honda Motor Co., Ltd., Tokyo (JP)

(72) Inventor: Kazuhiro Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 194 days.

(21) Appl. No.: 17/964,934

(22) Filed: Oct. 13, 2022

(65) Prior Publication Data

US 2024/0126261 A1    Apr. 18, 2024

(51) Int. Cl.
*G05D 1/00*    (2024.01)
*B63B 79/40*    (2020.01)

(52) U.S. Cl.
CPC .......... *G05D 1/0206* (2013.01); *B63B 79/40* (2020.01)

(58) Field of Classification Search
CPC ...... G05D 1/0206; G05D 1/243; G05D 1/606; G05D 1/661; G05D 1/81; G05D 2105/22; G05D 2107/84; G05D 2109/34; G05D 2111/10; B63B 79/40; B63H 25/04
See application file for complete search history.

(56) References Cited

U.S. PATENT DOCUMENTS

| 2005/0232469 A1* | 10/2005 | Schofield | B60R 1/12 382/104 |
| 2023/0102473 A1* | 3/2023 | Kunz | B63B 34/05 701/21 |
| 2023/0375989 A1* | 11/2023 | Miyabe | G05D 1/0875 |

FOREIGN PATENT DOCUMENTS

| CN | 113791012 A | * | 12/2021 |
| JP | 2019162977 A | * | 9/2019 |
| JP | 6621102 | | 12/2019 |
| JP | 2021076537 | | 5/2021 |
| JP | 6969047 | | 11/2021 |

OTHER PUBLICATIONS

English translation of Meng et al. (CN-113791012) (Year: 2021).*
English translation of Murata et al. (JP 2019162977). (Year: 2019).*

* cited by examiner

*Primary Examiner* — Kyle J Kingsland
(74) *Attorney, Agent, or Firm* — JCIPRNET

(57) ABSTRACT

A system, adapted for correcting an effect of an external disturbance on a boat. The system includes a control unit including a processor configured to function as: a disturbance obtaining unit, that obtains disturbance information of the boat, the disturbance information of the boat including at least one of a flow direction of the boat, a flow speed of the boat, or a rotation direction of the boat while a propulsion unit of the boat is stopped; a switching unit, that switches a control mode of the control unit to an automatic driving mode; a setting unit, that sets a steering route of the automatic driving mode, wherein, when the control mode is switched to the automatic driving mode, the control unit controls an automatic steering of the boat based on the disturbance information of the boat and the steering route of the automatic driving mode.

16 Claims, 4 Drawing Sheets

SYSTEM FOR CORRECTING EFFECT OF TIDAL CURRENT AND WIND ON BOAT

BACKGROUND OF THE DISCLOSURE

Technical Field

The disclosure relates to a system for an automatic steering of a boat, and more specifically relates to a system for correcting an effect of an external disturbance on the boat, such as the effect of a tidal current and/or a wind on the boat.

Related Art

Conventionally, a boat may be susceptible to an external disturbance. The external disturbance may be, for example, a tidal current and/or a wind acting on the boat. When the boat is being automatically steered, for example, in an automatic docking mode for docking to a pier, it may be difficult to control the boat according to a steering route set by the automatic docking mode due to the external disturbance acting on the boat.

The external disturbance such as the tidal current and/or the wind may be measured directly with a tidal current sensor and/or a wind sensor, wherein an effect of the external disturbance may be predicted based on the external disturbance that is measured directly by the sensor. However, a system including the tidal current sensor and/or the wind sensor may become complicated.

Therefore, a system is needed for predicting an effect of the external disturbance on the boat without obtaining the external disturbance on the boat directly from the tidal current sensor and/or the wind sensor.

SUMMARY

According to an embodiment of the disclosure, a system adapted for correcting an effect of an external disturbance on a boat is provided. The system includes a control unit including a processor configured to function as: a disturbance obtaining unit, obtaining disturbance information of the boat, the disturbance information of the boat including at least one of a flow direction of the boat, a flow speed of the boat, or a rotation direction of the boat while a propulsion unit of the boat is stopped; a switching unit switching a control mode of the control unit to an automatic driving mode; a setting unit setting a steering route of the automatic driving mode, wherein, when the control mode is switched to the automatic driving mode, the control unit controls an automatic steering of the boat based on the disturbance information of the boat and the steering route of the automatic driving mode.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figures 1, 2:
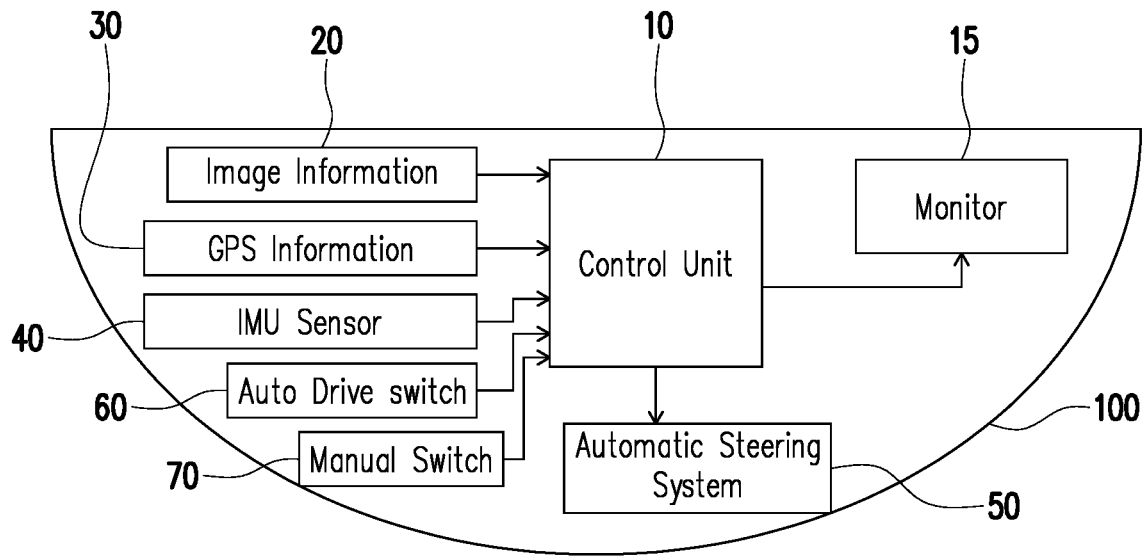
FIG. 1 is a schematic diagram illustrating a system for correcting an effect of an external disturbance on a boat according to an embodiment of the disclosure.
FIG. 2 is a schematic diagram illustrating some examples of image information according to an embodiment of the disclosure.

FIG. 1 is a schematic diagram illustrating a system for correcting an effect of an external disturbance on a boat according to an embodiment of the disclosure. Referring to FIG. 1, a boat 100 is provided. The boat 100 may be, for example, a water vessel, a water craft, a ship and/or the like. The boat 100 includes a propulsion system, for example, a motor for propelling the boat 100 in water. The motor may be, for example, an inboard motor, an outboard motor, a partially inboard-partially outboard motor and the like. The propulsion system may include a propulsion unit, for example, a propeller which is coupled to and rotated by an output shaft of the motor. The boat 100 includes a steering system, for example, a steering wheel coupled to a rudder to steer a direction of the boat 100. The steering wheel may be coupled to the rudder by, for example, a cable or a wire or the like.

The boat 100 includes a control unit 10. The control unit 10 includes, for example, a processor and a memory. The boat 100 includes a manual driving mode and an automatic driving mode. More specifically, the boat 100 includes an automatic steering system 50 for automatically driving/steering the boat in the automatic driving mode. The automatic driving mode may further include an automatic navigation mode and an automatic docking mode. That is to say, the automatic navigation mode and the automatic docking mode are each examples of the automatic driving mode. The control unit 10 may switch a control mode of the boat 100 to the automatic navigation mode when the boat 100 is automatically steered in open water. The control unit 10 may switch the control mode of the boat 100 to the automatic docking mode when the boat 100 is automatically steered to dock to a pier. The automatic steering system 50 is used to automatically steer the boat 100 in the automatic navigation mode and the automatic docking mode. The control unit 10 is coupled to the automatic steering system 50, wherein the control unit 10 outputs (sends/transmits) control signals to the automatic steering system 50 to automatically drive/steer the boat 100.

Referring to FIG. 1, a user may switch an operation mode of the boat 100 to the manual driving mode by, for example, activating a manual switch 70. In addition, the user may switch the operation mode of the boat 100 to the automatic driving mode by, for example, activating the auto drive switch 60. The auto drive switch 60 and the manual switch 70 may each be, for example, a physical push button, a touch button on an HMI (for example, the monitor 15 may be a capacitive touch screen) and/or the like. Each of the auto drive switch 60 and the manual switch 70 is an example of an input unit. The auto drive switch 60 and the manual switch 70 are coupled to the control unit 10, wherein the control unit 10 receives an input from the auto drive switch 60 and the manual switch 70.

Referring to FIG. 1, when the user activates the auto drive switch 60, the control unit includes a switching unit that automatically switches a control mode of the control unit 10 to an automatic driving mode. When the control mode is switched to the automatic driving mode, the control unit 10 is configured to output a control signal to the automatic steering system 50 for controlling an automatic steering of the boat 100. When the user activates the manual switch 70, the switching unit of the control unit 10 automatically switches the control mode of the control unit 10 to the manual driving mode. When the control mode is switched to the manual driving mode, the control unit 10 is configured to not output the control signal for controlling the automatic steering of the boat 100, or to disengage the automatic steering system 50 of the boat 100 such that the boat 100 may be steered and/or controlled manually by the user.

In more detail, the control unit 10 controls an automatic steering of the boat 100 via the automatic steering system 50 when the control unit 10 is in the automatic driving mode. The control unit 10 may also determine an automatic steering route of the boat 100 when the control unit 10 is in the automatic driving mode. Namely, the control unit 10 may determine the automatic steering route of the boat 100 when the control unit 10 is in the automatic navigation mode and when the control unit 10 is in the automatic docking mode of the automatic driving mode. In the present disclosure, docking may be used interchangeably with mooring, berthing and/or the like. That is to say, the control unit 10 controls an automatic docking, mooring and/or berthing of the boat 100 via the automatic steering system 50. The control unit 10 may also determine an automatic docking route, an automatic mooring route and/or an automatic berthing route of the boat 100.

The automatic steering system 50 may include, for example, sensors, switches and actuators and/or the like. For example, an actuator may be used for automatically turning the steering wheel. In another example, an actuator may be used for controlling the throttle. A switch may be used to switch the rotating direction of the motor to move forward or reverse. A sensor may be used to detect a position of the boat 100. A sensor may be used for detecting objects in a surrounding of the boat 100.

Referring to FIG. 1, a monitor 15 is disposed on the boat 10. The monitor 15 is an example of a display unit. The monitor 15 includes a display for displaying an image. The monitor 15 is coupled to the control unit 10.

Referring to FIG. 1, the control unit 10 receives image information 20 and GPS information 30. More specifically, the boat 100 includes a GPS for obtaining the GPS information 30. The GPS is an example of a Global Navigation Satellite System (GNSS).

In addition, the boat 100 includes an IMU sensor 40. The IMU sensor 40 may include, for example, a control moment gyro(s) to provide orientation information such as pitch, roll, yaw information of the boat 100.

FIG. 2 is a schematic diagram illustrating some examples of image information according to an embodiment of the disclosure. Referring to FIG. 2, the image information 20 may be, for example, a lidar image, an aerial drone image, an underwater drone image, a satellite image, a cameral image and/or the like. The image information 20 may be an image that is obtained in real time or an image that is stored in a memory. For example, the image information may be obtained in real time from the lidar, the camera disposed on the underwater drone, the camera disposed on the aerial drone, the camera disposed on the boat 100, the camera on satellite and/or the like. In another embodiment, the image information 20 may be obtained from an image stored in memory, such as images from the lidar, the underwater drone, the aerial drone, the camera on the boat 100, the camera on satellite and/or the like that are store in a memory. The above examples of the image information 20 are described as examples only and are not intended to limit the disclosure.

Lidar is an acronym for "light detection and ranging" or "laser imaging, detection, and ranging". The boat 100 may include the lidar for obtaining the lidar image. The boat 100 may include a camera having an image sensor for obtaining the camera image. The aerial drone image may be obtained from an aerial drone carrying a camera. The underwater drone image may be obtained from an underwater drone carrying a camera. The satellite image may be obtained from a satellite carrying a camera. The drone (for example the aerial drone and the underwater drone) may include a GPS disposed thereon for acquiring a position of the drone.

Figure 3:
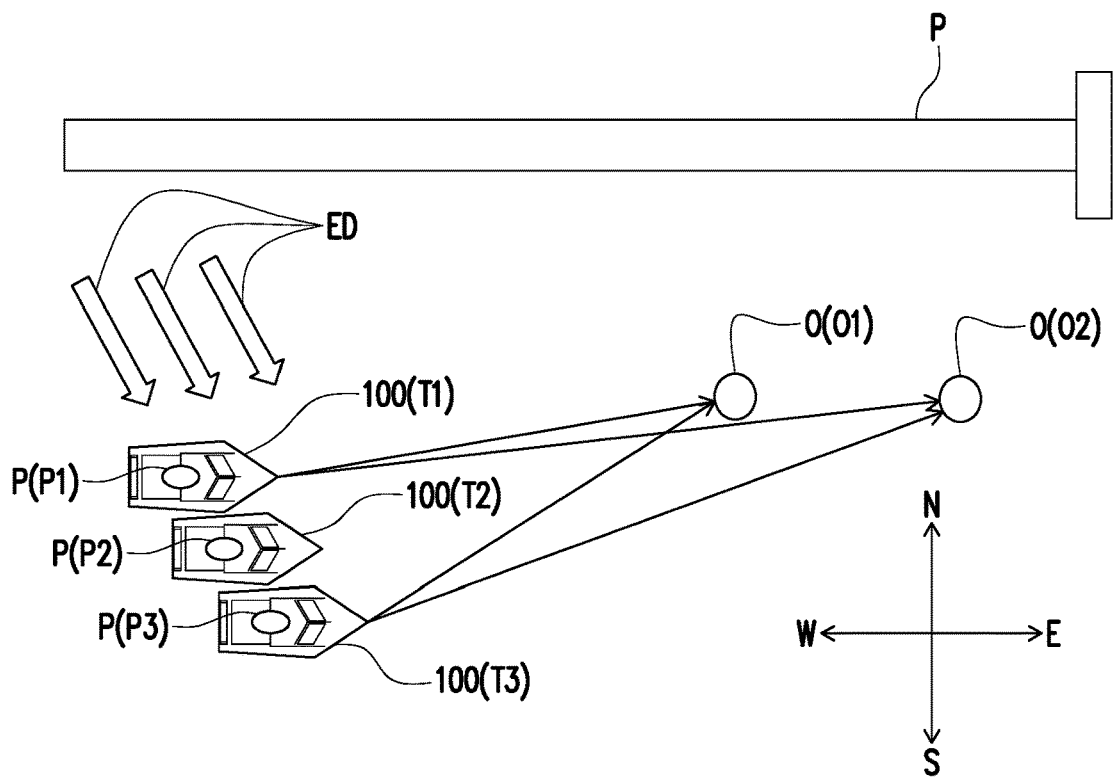
FIG. 3 is a schematic diagram illustrating a change in position of a boat due to an external disturbance acting on the boat according to an embodiment of the disclosure.

FIG. 3 is a schematic diagram illustrating a change in position of a boat due to an external disturbance acting on the boat according to an embodiment of the disclosure. Referring to FIG. 3, the boat 100 and an object O are provided. The object O may be, for example, a pillar that is fixed to the bottom of the ocean floor. The object O may be, for example, a wooden stake that is fixed to the bottom of the ocean floor. The object O may be, for example, a cleat on the dock D for tying off a rope. The object O may be, for example, an obstacle such as another boat moored to the dock D. The another boat moored to the dock D is substantially stationary. The objects O are described as examples only, and are not intended to limit the disclosure. In addition, a number of the objects O is not intended to limit the disclosure. In the present embodiment, the object O1 and the object O2 are pillars that are fixed to the ocean floor.

Referring to FIG. 3, the boat 100 is located at a plurality of positions P over time. In more detail, at a first timing T1, the boat 100 is illustrated as the boat 100(T1) and is located at a first position P(P1). At a second timing T2, the boat 100 is illustrated as the boat 100(T2) and is located at a second position P(P2). At a third timing T3, the boat 100 is illustrated as the boat 100(T3) and is located at a third position P(P3). In the present embodiment, the boat 100 moves from the first position P1 to the second position P2 to the third position P3 over time.

The first position P1, the second position P2 and the third position P3 may be represented by x-y coordinates, for example, the first position P1(x1, y1), the second position P2(x2, y2) and the third position P3(x3, y3). x1, x2, x3, y1, y2, y3 may represent, for example, longitudinal and latitudinal coordinates. Similarly, a position P(x,y) of the object O may be represented by, for example longitudinal and latitudinal coordinates. However, the disclosure is not limited thereto and the position P of the boat 100 and the object O may be represented differently according to requirements. In another embodiment of the disclosure, the position P of the object O may set as the origin of the coordinate system such as the object O has the position P(0,0).

Referring to FIG. 3, an external disturbance ED is acting on the boat 100 such that a position of the boat 100 changes from the first position P1 to the second position P2 to the third position P3. The propulsion unit of the boat 100 is stopped while the boat 100 moves from the from the first position P1 to the second position P2 to the third position P3.

The external disturbance ED may be, for example, a tidal current, a wind and/or the like. However, the disclosure is not limited thereto.

Referring to FIG. 3, the control unit 10 is configured to obtain disturbance information of the boat 100, the disturbance information of the boat 100 includes at least one of a flow direction of the boat 100, a flow speed of the boat 100, or a rotation direction of the boat 100 while the propulsion unit of the boat 100 is stopped. That is to say, the control unit 10 obtains the disturbance information of the boat 100 while the propulsion unit, such as the propeller, of the boat 100 is stopped and not rotating. In other words, the control unit 10 obtains the disturbance information of the boat 100 while the boat 100 is not actively being propelled by the motor. In this way, the disturbance information of the boat 100 does not include a disturbance originating from the propulsion from the boat 100 it self, and the disturbance information of the boat 100 may be obtained more accurately. Since the propulsion unit of the boat 100 is stopped, the flow direction of the boat 100, the flow speed of the boat 100 and/or the rotation direction of the boat 100 from the first position P1 to the third position P3 are originating from the external disturbance ED acting on the boat 100.

Referring to FIG. 3, the flow direction of the boat 100, the flow speed of the boat 100 and/or the rotation direction of the boat 100 may be obtained via the image information 20. In other words, the flow direction of the boat 100, the flow speed of the boat 100 and/or the rotation direction of the boat 100 may be obtained from the images captured by the lidar camera disposed on boat 100 and/or the camera disposed on the boat 100. For example, when the control unit 10 obtains the image information 20 that includes the lidar image, the control unit 10 may identify the first object O1 and/or the second object O2 in the lidar images. The control unit 10 may determine the position P of the boat 100 relative to the first object O1 and/or the second object O2 in the lidar image. Accordingly, based on a position of the object O in the lidar image, the control unit 10 may determine the boat 100 is located at the first position P1(x1, y1) at the first timing T1, and determine the boat 100 is located at the second position P2(x2,y2) at the second timing T2, and determine the boat 100 is located at the third position P3(x3,y3) at the third timing T3. Then, based on a displacement between the first position P1 and the second position P2, the lidar camera (and/or the control unit 10) may determine the flow direction, the flow speed and the rotation direction of the boat 100.

More specifically, a camera is disposed on the boat 100, and at least one of the flow direction of the boat 100, the flow speed of the boat 100, or the rotation direction of the boat may be determined based on an image imaged by the camera. An example of how the camera (and/or the control unit 10) determines the flow direction of the boat 100, the flow speed of the boat 100, and the rotation direction of the boat 100 is described below for reference.

Referring to FIG. 3, after determining the plurality of positions P1, P2, P3 of the boat 100 corresponding to the plurality of times T1, T2, T3, the control unit 10 may calculate a displacement of the boat 100 between the first position P1(x1, y1) and the second position P2(x2, y2). In another embodiment of the disclosure, the control unit 10 may calculate a displacement of the boat 100 between the first position P1(x1, y1) and the third position P3(x3, y3). In another embodiment of the disclosure, the control unit 10 may calculate a displacement of the boat 100 between the second position P2(x2, y2) and the third position P3(x3, y3).

Referring to FIG. 3, the flow direction of the boat 100 may be determined by the displacement of the boat 100. The flow speed of the boat 100 may be determined by the displacement of the boat 100 over time. The rotation direction of the boat 100 and/or a change in the pointing direction of the boat 100 may be determined by the displacement of the boat 100 and a change in location of the object O in the lidar image. More specifically, the flow direction of the boat 100, the flow speed of the boat 100, or the rotation direction of the boat 100 may be determined based on a change in a location of the object O included in the image imaged by the camera and/or the lidar camera.

In another embodiment of the disclosure, the displacement of the boat 100 may not be needed for determining the flow direction, the flow speed, and the rotation direction of the boat 100. More specifically, the flow direction of the boat 100, the flow speed of the boat 100, or the rotation direction of the boat 100 may be determined based on a change in a size of the object O included in the image imaged by the camera and/or the lidar camera. More specifically, the flow direction of the boat 100, the flow speed of the boat 100, or the rotation direction of the boat 100 may be determined based on a change in a shape of the object O included in the image imaged by the camera and/or the lidar camera. For example, if the object O becomes smaller in the image imaged by the camera or the lidar camera, the control unit 10 may determine the flow direction of the boat 100 is away from the object O. In another example, if the shape of the object O changes in the image imaged by the camera or the lidar camera, the control unit 10 may determine the boat 100 has flowed past the object O, since the shape of the object O viewed from one direction may be different when viewed from another direction.

In this way, the disturbance information including the flow direction of the boat, the flow speed of the boat and/or the rotation direction of the boat may be obtained from the camera and/or the lidar camera while the propulsion unit of the boat 100 is stopped. Furthermore, the effect of the external disturbance ED on the boat 100 (for example, the displacement of the boat 100 due to the external disturbance) is obtained from the camera and/or the lidar camera without obtaining an external disturbance on the boat 100 directly from a tidal current sensor and/or a wind sensor. That is to say, the displacement of the boat 100 due to the external disturbance ED is obtained without obtaining the external disturbance on the boat 100 from the tidal current sensor and/or the wind sensor directly.

Referring to FIG. 3, the displacement of the boat 100 due to the external disturbance ED was determined using the lidar image as an example of the image information 20. However, the disclosure is not limited thereto. In other embodiments of the disclosure, the displacement of the boat 100 due to the external disturbance ED may be determined using a camera image from a camera disposed on the boat 100, a satellite image, a drone image and/or the like.

Referring to FIG. 3, in another embodiment of the disclosure, the displacement of the boat 100 due to the external disturbance ED may be determined using the GPS disposed on the boat 100. That is to say, in an embodiment of the disclosure, the disturbance obtaining unit may obtain the disturbance information of the boat 100 based on a displacement of the boat 100 obtained from the GNSS receiver, instead of a displacement of the boat 100 obtained from the image information 20.

Figure 4:
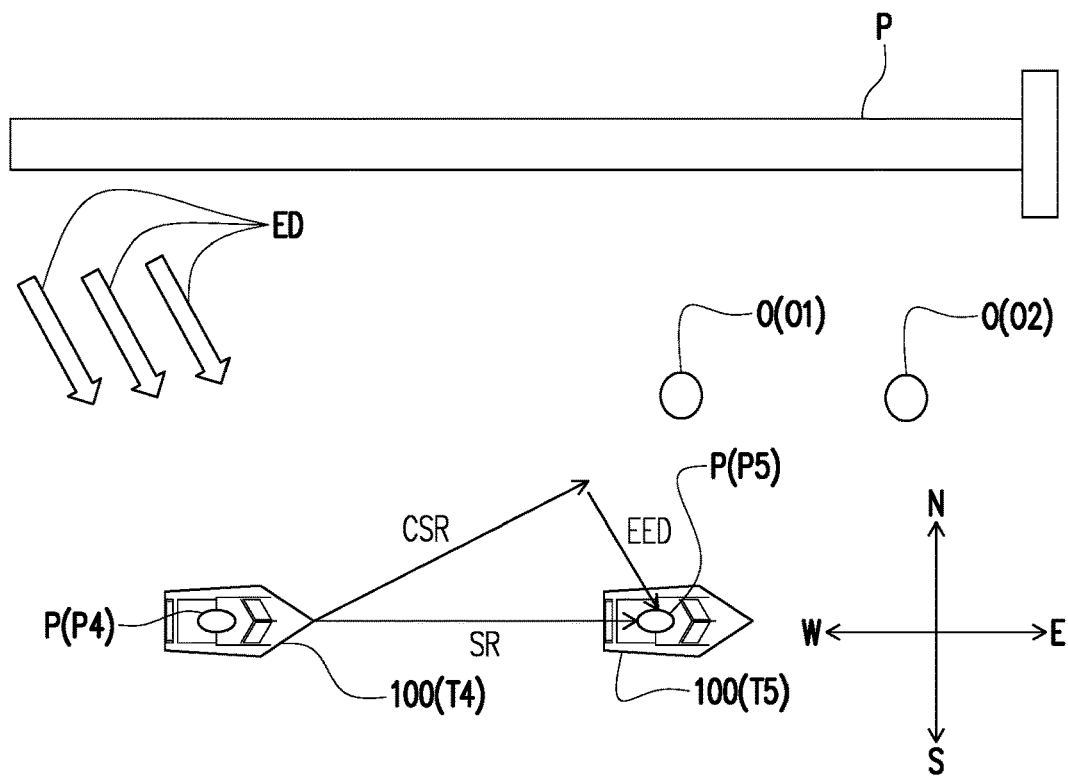
FIG. 4 is a schematic diagram illustrating a steering route of an automatic driving mode according to an embodiment of the disclosure.

FIG. 4 is a schematic diagram illustrating a steering route of the automatic driving mode according to an embodiment of the disclosure. Referring to FIG. 4, the fourth position P4 may be a current position of the boat 100, and the fifth position P5 is a destination position of the boat 100. The control unit 10 includes a setting unit that calculates and/or sets a steering route SR of the automatic driving mode of the boat 100. That is to say, the control unit 10 sets the steering route SR for automatically steering the boat 100 from the fourth position P4 to the fifth position P5. In the present embodiment, the control unit 10 is switched to the automatic navigation mode of the automatic driving mode.

Referring to FIG. 4, in order to compensate for the external disturbance ED acting on the boat 100, the control unit 10 may calculate an effect of the external disturbance EED stemming from the external disturbance ED. After the control unit 10 calculates the effect of the external disturbance EED from the disturbance information, the control unit 10 may set a compensated steering route CSR. The compensated steering route CSR is calculated and/or set based on the disturbance information of the boat 100 and the steering route SR of the automatic driving mode. In more detail, the compensated steering route CSR may be calculated and/or set based on the steering route SR and the flow direction of the boat 100 obtained from the disturbance information. In another embodiment of the disclosure, the compensated steering route CSR may be calculated and/or set based on the steering route SR and the flow speed of the boat 100 obtained from the disturbance information. In another embodiment of the disclosure, the compensated steering route CSR may be calculated and/or set based on the steering route SR and the rotation direction of the boat 100 obtained from the disturbance information. In another embodiment of the disclosure, the compensated steering route CSR may be calculated and/or set based on a combination of the flow direction of the boat 100, the flow speed of the boat 100, the rotation direction of the boat 100, the steering route SR and/or the like.

Referring to FIG. 4, when the control mode is switched to the automatic driving mode, the control unit 10 controls the automatic steering of the boat 100 based on the compensated steering route CSR, wherein the compensated steering route CSR is calculated and/or set based on the disturbance information of the boat 100 and the steering route SR of the automatic driving mode. The steering route SR of the boat 100, the compensated steering route CSR of the boat 100 and/or the effect of the external disturbance EED such as shown in FIG. 4 may be displayed on the monitor 15 for a user to see.

Referring to FIG. 3, it was described above that the control unit 10 is configured to obtain the disturbance information of the boat 100 while a propulsion unit of the boat 100 is stopped. In this way, the displacement of the boat 100 obtained by the control unit 10 is a displacement of the boat 100 that is due to the external disturbance ED, and not a displacement of the boat 100 that is due to a propulsion from the boat 100. After obtaining the displacement of the boat 100 that is due to the external disturbance ED, the disturbance information may be obtained from the displacement of the boat 100. However, there may be a case that the displacement of the boat 100 obtained by the control unit 10 is not solely due to the external disturbance ED, but also includes a displacement of the boat 100 due to a remaining inertia of the boat 100 at a time when the propulsion unit is stopped.

Referring to FIG. 3, at a time when the propulsion unit (for example, the propeller of the boat 100) is stopped, for example, a the first position P1, the boat 100 may have a remaining inertia which contributes to a movement of the boat 100. That is to say, the displacement of the boat 100 obtained by the control unit 10 may include a displacement of the boat 100 due to the external disturbance ED, and a displacement of the boat 100 due to the remaining inertia of the boat 100. In an embodiment of the disclosure, in order to reduce and/or eliminate a displacement of the boat 100 due to the remaining inertia of the boat 100, the disturbance information of the boat 100 may be obtained when a predetermined time has passed after the propulsion unit of the boat 100 is stopped at the first position P1. In this way, the effect that the remaining inertia of the boat 100 has on the displacement of the boat 100 may be negated and/or reduced. In this way, by obtaining the disturbance information of the boat 100 when a predetermined time has passed after the propulsion unit of the boat 100 is stopped, a displacement of the boat 100 due to the remaining inertia of the boat 100 may be eliminated and/or reduced, and a displacement of the boat 100 that is due to the external disturbance ED may be obtained.

Figure 5:
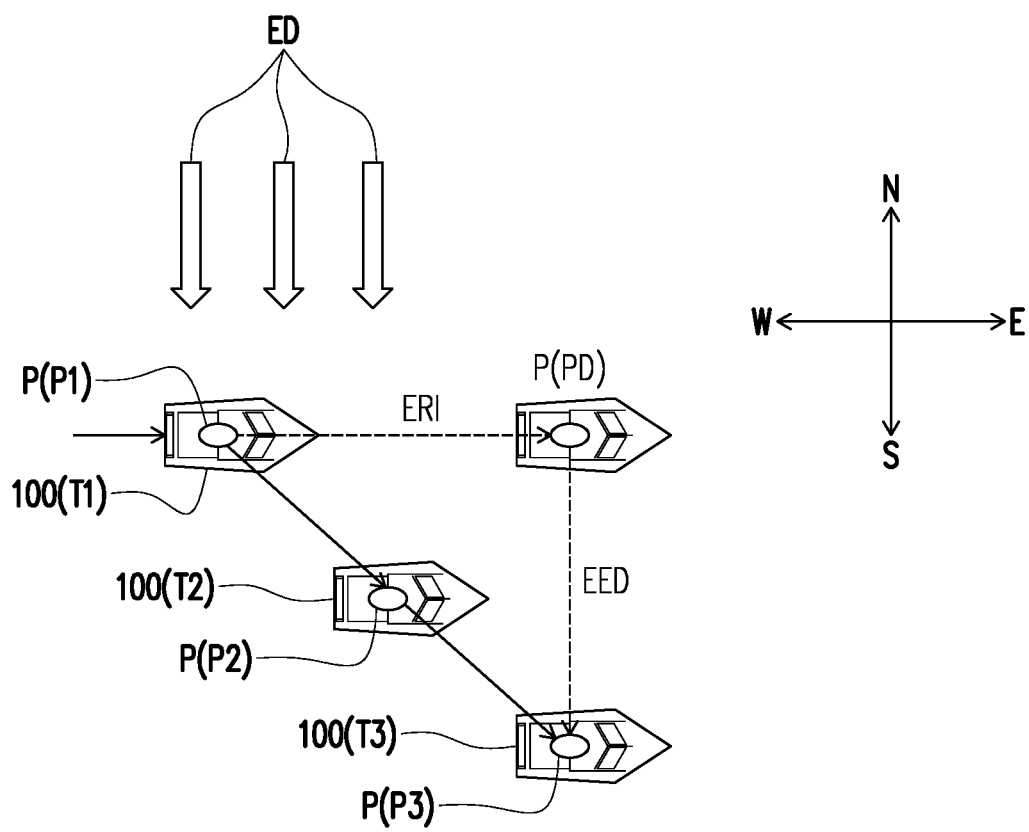
FIG. 5 is a schematic diagram illustrating a projected displacement of the boat that is due to an external disturbance and a remaining inertia of the boat at a time the propulsion unit of the boat is stopped according to an embodiment of the disclosure.

FIG. 5 is a schematic diagram illustrating a projected displacement of the boat that is due to an external disturbance and a remaining inertia of the boat at a time the propulsion unit of the boat is stopped according to an embodiment of the disclosure. Referring to FIG. 5, the control unit 10 may further include a movement calculation unit that calculates a projected movement information of the boat 10. The projected movement information of the boat 100 includes a projected displacement PD of the boat 100 that is due to a remaining inertia of the boat 100 at a time the propulsion unit of the boat 100 is stopped at the first position P1.

Referring to FIG. 5, the projected displacement PD of the boat 100 may be calculated based on a speed of the boat 100 and/or a steering direction of the boat 100. The projected displacement PD of the boat 100 that is due to a remaining inertia of the boat 100 is an example of the effect of the remaining inertia ERI of the boat 100.

Referring to FIG. 5, in the present embodiment, the control unit 10 may calculate, for example, an actual displacement of the boat 100 between the first position P1(x1, y1) and the third position P3(x3, y3) by using, for example, the camera and/or the lidar camera. In another embodiment of the disclosure, the control unit 10 may calculate the actual displacement of the boat 100 between the first position P1(x1, y1) and the second position P2(x2, y2). In another embodiment of the disclosure, the control unit 10 may calculate the actual displacement of the boat 100 between the second position P2(x2, y2) and the third position P3(x3, y3). However, the disclosure is not limited thereto.

Referring to FIG. 5, a true displacement of the boat 100 that is due to the external disturbance ED may be calculated by, subtracting the projected displacement PD of the boat 100 that is due to the inertia from the actual displacement of the boat 100 between the first position P1(x1, y1) and the third position P3(x3, y3). Accordingly, by subtracting the projected displacement PD from the actual displacement of the boat 100, the control unit 10 may determine the external disturbance ED is pushing the boat in a due South direction only, and the external disturbance ED does not push the boat in the East, West or North direction. In this way, the effect of the remaining inertia of the boat 100 may be negated and/or reduced and the external disturbance ED may be determined more accurately.

In the above embodiment, it was described that the actual displacement of the boat 100 between the first position P1(x1, y1) and the third position P3(x3, y3) may be measured by the imaging information 20 (obtained from, for example, the camera and/or the lidar camera). In another embodiment of the disclosure, the actual displacement of the boat 100 between the first position P1(x1, y1) and the third position P3(x3, y3) may be measured by, for example, a GNSS receiver.

In this way, the control unit 10 may control the automatic steering of the boat 100 based on the disturbance information of the boat 100, the projected movement information of the boat 100, and the steering route SR of the automatic driving mode. That is to say, in the case the disturbance information of the boat 100 obtained by the control unit 10 may be influenced by the remaining inertia of the boat 100 when the propulsion unit of the boat 100 is stopped, the control unit 10 may compensate the disturbance information of the boat 100 with the projected movement information of the boat 100 to obtain the true displacement of the boat 100 that is due to the external disturbance ED. After the true displacement of the boat 100 that is due to the external disturbance ED is obtained, the flow direction of the boat 100 may be determined by the true displacement of the boat 100. The flow speed of the boat 100 may be determined by the true displacement of the boat 100 over time. The rotation direction of the boat 100 and/or a change in the pointing direction of the boat 100 may be determined by the true displacement of the boat 100 and a difference in location of the object O in the lidar image.

Referring to FIG. 5, in the present embodiment, the boat 100 is travelling due East and the propulsion unit of the boat 100 is stopped at the first position P1. The boat 100 has a remaining inertia at the first position P1 which contributes to a displacement of the boat 100 towards the East direction. In other words, an effect of the remaining inertia ERI pushes the boat in the East direction only. In the present embodiment, the external disturbance ED is pushing the boat in a due South direction only, and the external disturbance ED does not push the boat in the East, West or North direction. In other words, the effect of the external disturbance EED pushes the boat in the South direction only. The above is described as an example only and is not intended to limit the disclosure.

In an embodiment of the disclosure, the control unit 10 may obtain the disturbance information of the boat 100 at a start of the automatic driving mode or during the automatic driving mode. That is to say, the control unit 10 may obtain the disturbance information of the boat 100 after the auto drive switch 60 is activated or pressed.

In another embodiment of the disclosure, the control unit 10 may obtain the disturbance information of the boat 100 before a start of the automatic driving mode, at a time when the propulsion unit of the boat 100 is stopped. That is to say, the control unit 10 may obtain the disturbance information of the boat 100 before the auto drive switch 60 is activated or pressed. That is to say, the control unit 10 may obtain the disturbance information of the boat 100 when the boat 100 is in manual mode at a time when the propulsion unit of the boat 100 is stopped.

It was described above that the flow direction of the boat 100, the flow speed of the boat 100 and/or the rotation direction of the boat 100 included in the disturbance information of the boat 100 is obtained via the image information 20 from the camera and/or the lidar camera. However, the disclosure is not limited thereto. In another embodiment of the disclosure, the flow direction of the boat 10, the flow speed of the boat 100 or the rotation direction of the boat 100 included in the disturbance information of the boat 100 may be obtained via, for example, the GPS information 30 from the GPS receiver and/or the IMU sensor 40.

Figure 6:
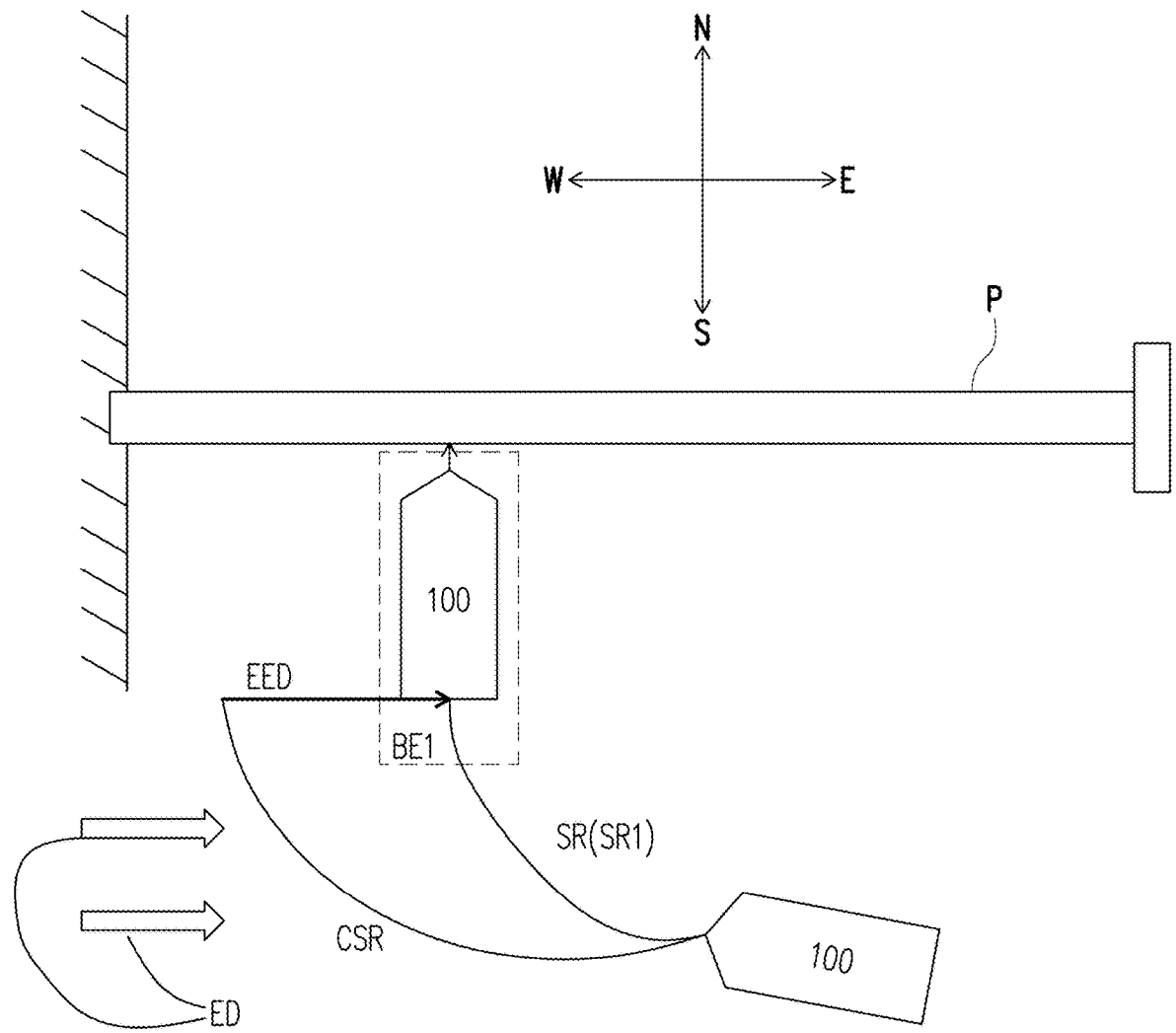
FIG. 6 is a schematic diagram illustrating a steering route of an automatic driving mode when the automatic driving mode is in an automatic docking mode according to an embodiment of the disclosure.

FIG. 6 is a schematic diagram illustrating a steering route of an automatic driving mode when the automatic driving mode is in an automatic docking mode according to an embodiment of the disclosure. Referring to FIG. 6, the control unit 10 is configured to identify a berth for mooring the boat 100. More specifically, the control unit 10 may identify a first berth BE1 for mooring the boat 100 to the pier P, based on the image information 20. That is to say, the control unit 10 may identify a berth that is not occupied by other boats from the image information 20. A number of the open berths for mooring the boat 100 identified by the control unit 10 is not intended to limit the disclosure.

Referring to FIG. 6, the control mode of the control unit 10 is switched to the automatic docking mode of the automatic driving mode. The control unit 10 sets the steering route SR1 of the automatic docking mode of the boat 100 to moor the boat 100 at the first berth BE1. That is to say, the control unit 10 sets the steering route SR1 for automatically steering the boat 100 to moor the boat 100 at the first berth BE1.

Referring to FIG. 6, in order to compensate for an effect of the external disturbance EED due to the external disturbance ED, the control unit 10 may calculate and/or set a compensated steering route CSR. The compensated steering route CSR is calculated and/or set based on the disturbance information of the boat 100 and the steering route SR1 of the automatic docking mode. In more detail, the compensated steering route CSR may be calculated and/or set based on the steering route SR1 and the flow direction (disturbance information) of the boat 100 obtained from the disturbance information. In another embodiment of the disclosure, the compensated steering route CSR may be calculated and/or set based on the steering route SR1 and the flow speed (disturbance information) of the boat 100 obtained from the disturbance information. In another embodiment of the disclosure, the compensated steering route CSR may be calculated and/or set based on the steering route SR1 and the rotation direction (disturbance information) of the boat 100 obtained from the disturbance information. In another embodiment of the disclosure, the compensated steering route CSR may be calculated and/or set based on a combination of the flow direction of the boat 100, the flow speed of the boat 100, the rotation direction of the boat 100, the steering route SR1 and/or the like.

As described above, when the control mode is switched to the automatic docking mode, the control unit 10 controls an automatic steering of the boat 100 based on the compensated steering route CSR, wherein the compensated steering route CSR is calculated and/or set based on the disturbance information of the boat 100 and the steering route SR of the automatic driving mode. The steering route SR1 of the boat 100, the compensated steering route CSR of the boat 100 and/or the effect of the external disturbance EED such as shown in FIG. 4 may be displayed on the monitor 15 for a user to see.

It should be noted, in the present disclosure, the physical displacement of the boat 100 is actually measured (for example, by the camera, the GPS and/or the like) to obtain, estimate and/or predict the external disturbance ED (and/or the effect of the external disturbance EED) on the boat 100, without directly obtaining the external disturbance ED on the boat from a tidal current sensor and/or a wind sensor. That is to say, the tidal current sensor and the wind sensor do not measure a physical displacement of the boat 100 to determine the external disturbance ED.

In the above embodiments, it was described where the disturbance information was obtained from the camera, the lidar camera and the GPS disposed on the boat 100. However, the disclosure is not limited thereto. The disturbance information may be obtained from the camera, the lidar camera and the GPS that is disposed on the drone. For example, the tidal current may be obtained from the camera, the lidar camera, the GPS disposed on the underwater drone. That is to say, the tidal current may be determined relative to the underwater drone. In another example, the wind may be obtained from the camera, the lidar camera, the GPS disposed on the aerial drone. That is to say, the effect of the wind may be determined relative to the aerial drone. Then the disturbance information from the tidal current may be provided to the control unit 10 of the boat 100 via the underwater drone, and the disturbance information from the wind may be provided to the control unit 10 of the boat 100 via the aerial drone.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system, adapted for correcting an effect of an external disturbance on a boat, the system comprising:
    a control unit, comprising a processor, configured to function as:
        a disturbance obtaining unit, that obtains disturbance information of the boat, the disturbance information of the boat including at least one of a flow direction of the boat while a propulsion unit of the boat is stopped, a flow speed of the boat while the propulsion unit of the boat is stopped, or a rotation direction of the boat while the propulsion unit of the boat is stopped;
        a switching unit, that switches a control mode of the control unit to an automatic driving mode;
        a setting unit, that sets a steering route of the automatic driving mode to drive the boat to a destination position;
    wherein, when the control mode is switched to the automatic driving mode to drive the boat to the destination position, the control unit controls an automatic steering of the boat based on the disturbance information of the boat and the steering route of the automatic driving mode,
    wherein the control unit is configured to calculate:
    a steering route for automatically steering the boat to drive the boat to the destination position, and
    an effect of the external disturbance on the boat when the boat is driven in the automatic driving mode to the destination position,
    wherein the effect of the external disturbance on the boat is calculated from the disturbance information,
    wherein the control unit is further configured to calculate a projected movement information of the boat, the projected movement information of the boat including a projected displacement of the boat that is due to a remaining inertia of the boat at a time the propulsion unit of the boat is stopped, and the projected displacement of the boat is calculated based on a speed of the boat and a steering direction of the boat at the time the propulsion unit of the boat is stopped,
    wherein the control unit is configured to set a compensated steering route, that compensates for the effect of the external disturbance acting on the boat when the boat is driven in the automatic driving mode to the destination position, based on the steering route, the projected information of the boat and the effect of the external disturbance.

2. The system according to claim 1, wherein the control unit outputs a control signal for controlling the automatic steering of the boat when the control mode is switched to the automatic driving mode.

3. The system according to claim 1, wherein at least one of the flow direction of the boat, the flow speed of the boat, or the rotation direction of the boat is obtained based on a displacement of the boat while the propulsion unit of the boat is stopped.

4. The system according to claim 1, wherein the disturbance information of the boat is obtained when a predetermined time has passed after the propulsion unit of the boat is stopped.

5. The system according to claim 1,
    wherein the control unit controls the automatic steering of the boat based on the disturbance information of the boat, the projected movement information of the boat, and the steering route of the automatic driving mode.

6. The system according to claim 5, wherein a true displacement of the boat that is due to the external disturbance is calculated by, subtracting the projected displacement of the boat that is due to the inertia from an actual displacement of the boat measured by a Global Navigation Satellite System receiver.

7. The system according to claim 1, wherein the disturbance obtaining unit obtains the disturbance information of the boat at a start of the automatic driving mode or during the automatic driving mode.

8. The system according to claim 1, wherein the disturbance obtaining unit obtains the disturbance information of the boat before a start of the automatic driving mode, at a time when the propulsion unit of the boat is stopped.

9. The system according to claim 1, wherein a camera is disposed on the boat, and
    at least one of the flow direction of the boat, the flow speed of the boat, or the rotation direction of the boat is determined based on an image imaged by the camera.

10. The system according to claim 9, wherein at least one of the flow direction of the boat, the flow speed of the boat, or the rotation direction of the boat is determined based on a change in a location of an object included in the image imaged by the camera.

11. The system according to claim 9, wherein at least one of the flow direction of the boat, the flow speed of the boat, or the rotation direction of the boat is determined based on a change in a size of an object included in the image imaged by the camera.

12. The system according to claim 9, wherein at least one of the flow direction of the boat, the flow speed of the boat, or the rotation direction of the boat is determined based on a change in a shape of an object included in the image imaged by the camera.

13. The system according to claim 1, wherein the automatic driving mode is an automatic docking mode.

14. The system according to claim 1, wherein the disturbance obtaining unit obtains the disturbance information of the boat based on a displacement of the boat obtained from a Global Navigation Satellite System receiver.

15. The system according to claim 1, wherein the disturbance information is obtained without a tidal current sensor or a wind sensor.

16. A system, adapted for correcting an effect of an external disturbance on a boat, the system comprising:
- a control unit, comprising a processor, configured to function as:
  - a disturbance obtaining unit, that obtains disturbance information of the boat, the disturbance information of the boat including at least one of a flow direction of the boat while a propulsion unit of the boat is stopped, a flow speed of the boat while the propulsion unit of the boat is stopped, or a rotation direction of the boat while the propulsion unit of the boat is stopped;
  - a switching unit, that switches a control mode of the control unit to an automatic driving mode;
  - a setting unit, that sets a steering route of the automatic driving mode;
- wherein, when the control mode is switched to the automatic driving mode, the control unit controls an automatic steering of the boat based on the disturbance information of the boat and the steering route of the automatic driving mode,
- wherein the control unit further comprises: a movement calculation unit, that calculates a projected movement information of the boat, the projected movement information of the boat including a projected displacement of the boat that is due to a remaining inertia of the boat at a time the propulsion unit of the boat is stopped,
- wherein the control unit controls the automatic steering of the boat based on the disturbance information of the boat, the projected movement information of the boat, and the steering route of the automatic driving mode,
- wherein a true displacement of the boat that is due to the external disturbance is calculated by, subtracting the projected displacement of the boat that is due to the inertia from an actual displacement of the boat measured by a Global Navigation Satellite System receiver.

* * * * *